United States Patent
Karino et al.

[11] Patent Number: 5,871,681
[45] Date of Patent: Feb. 16, 1999

[54] ELECTROMAGNETIC SENSOR AND MOLDING METHOD FOR MANUFACTURING THE SAME

[75] Inventors: Kazuya Karino; Kazuo Yuhi, both of Miyazaki, Japan

[73] Assignee: Ohara & Komatsu, Assoc., Tokyo, Japan

[21] Appl. No.: 757,666

[22] Filed: Nov. 29, 1996

[30] Foreign Application Priority Data

Nov. 30, 1995 [JP] Japan .................................. 7-335976
Nov. 30, 1995 [JP] Japan .................................. 7-335977
Nov. 30, 1995 [JP] Japan .................................. 7-335978

[51] Int. Cl.$^6$ ........................... B29C 33/12; B29C 70/72
[52] U.S. Cl. ................................ 264/272.15; 264/272.19; 264/272.2; 29/602.1; 324/207.15
[58] Field of Search ....................... 264/272.14, 272.15, 264/272.19, 272.2, 275; 29/602.1, 605, 606, 607; 324/207.13, 207.14, 207.15

[56] References Cited

U.S. PATENT DOCUMENTS

| | | | |
|---|---|---|---|
| 4,339,407 | 7/1982 | Leighton | 264/272.14 |
| 5,088,186 | 2/1992 | Boesel | 264/272.14 |
| 5,100,311 | 3/1992 | Clemens et al. | 264/272.15 |
| 5,245,746 | 9/1993 | Stokes | 264/272.15 |
| 5,479,697 | 1/1996 | Togo | 264/272.15 |
| 5,659,246 | 8/1997 | Togo et al. | 264/272.15 |

FOREIGN PATENT DOCUMENTS 6-342002  12/1994  Japan .

*Primary Examiner*—Angela Ortiz
*Attorney, Agent, or Firm*—Longacre & White

[57] ABSTRACT

An electromagnetic sensor formed by integral resin molding of a sensing device in which a pointed protrusion and an apertured protrusion for positioning capable of complementally engagement to each other are provided one at an axial end face of the sensing device and the other at an inner surface of a molding die. A plurality of circumferentially spaced apart axially extending portions in an intimate contact with an inner circumference of the molding die are provided to the outer circumference at a lower portion of a bobbin of the sensing device. The positioning protrusion on an axial end face of the sensing device is shaped such that the size in a direction perpendicular to a streamline of the resin is gradually decreased as it is away from a resin injection gate. The sensing portion is positioned stably in the molding die, resin molding can be applied as far as the top end of the pole piece to provide protection, and water proofness of the sensor is improved by intact contact with the resin.

6 Claims, 5 Drawing Sheets

ELECTROMAGNETIC SENSOR AND MOLDING METHOD FOR MANUFACTURING THE SAME

DETAILED DESCRIPTION OF THE INVENTION

1. Field of the Invention

The present invention concerns an integrated type electromagnetic sensor in which a sensing device portion is insert molded.

2. Description of the Prior Art

An electromagnetic sensor in which a portion secured to a vehicle body and a portion for covering a sensing device are integrally molded by insert molding of coils, a pole piece, a permanent magnet and a yoke has been known (refer to Japanese Patent Laid-Open Hei 6-342002).

The electromagnetic sensor of such a type is integrally constituted entirely by insertion of the sensing device after primary fabrication in a molding die and injection of a molten resin into a cavity formed between the inner surface of the molding die and the outer surface of the sensing device. Therefore, the sensing device has to be secured stably in the molding die when the covering portion is formed on the periphery of the sensing device.

As a technical means adopted for this purpose, the above-mentioned patent literature proposes a method of at first injecting a molten resin in a state in which the sensing device is secured in the molding die by a slidable core, then withdrawing the slidable core after the resin has been cooled and solidified to some extent, and then further injecting a molten resin to the withdrawn portion.

However, this prior art method involves a problem of complicating the molding die since it requires a mechanism for the insertion and withdrawal of the slidable core and, in addition, requiring increased number of production steps since the resin has to be injected in two separate stages.

Further, in a case of using the electromagnetic sensor as described above for a rotational speed detector, the top end of the pole piece of the sensor has to be shaped by cutting so as to conform the tooth shape of a pulser gear in order to enhance a magnetic efficiency.

However, since the strength of the top end of the pole piece is lowered by the cutting, it is desirable to provide protection by molding the resin thoroughly as far as the top end of the pole piece, and the pole piece can be prevented also from rotation by such molding. However, molding of the resin as far as the top end makes it difficult to retain the pole piece at the center of the molding die.

Figure 8:
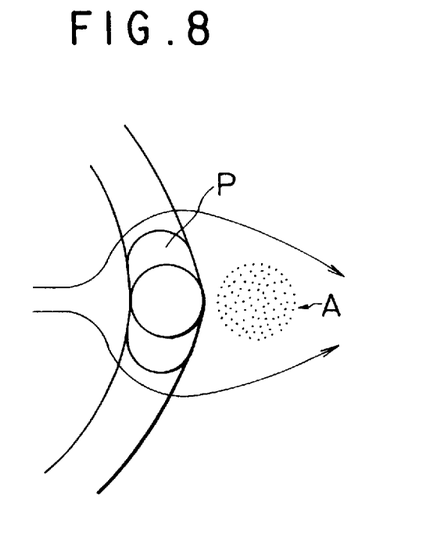
FIG. 8 is a schematic view for explaining a disadvantage which may be possibly caused at the downstream of a positioning protrusion.

Further, positioning protrusions for engagement with the molding die may be disposed to the sensing device in order to ensure stabilization in the molding die during molding. However, since the protrusion interferes with a stream of the molten resin, a smooth flow of the resin is hindered on the side of the protrusion away from the gate center, tending to cause an air stagnation A to the downstream of a positioning protrusion P as shown in FIG. 8. Therefore, there is a problem of partially deteriorating intimate contact between the sensing device and the covering portion is lowered.

OBJECT OF THE INVENTION

For overcoming the foregoing problems imposed on the prior art, an object of the present invention is to provide an assembly of an electromagnetic sensor and a molding die used for manufacturing the same, which is constituted so as not to complicate the structure of the molding die and not to increase the number of production steps.

Another object of the present invention is to provide an electromagnetic sensor having positioning means relative to a molding die constituted such that a molten resin can be caused to flow as far as the top end of a pole piece of a sensing device while reliably retaining the pole piece at the center of the molding die.

A further object of the present invention is to provide an electromagnetic sensor having a positioning means relative to a molding die constituted so as not to interfere with the flow of a molten resin during molding.

SUMMARY OF THE INVENTION

In accordance with a first aspect of the present invention, the foregoing object can be attained by an assembly of an electromagnetic sensor formed by inserting a sensing device in a molding die and injecting a molten resin thereby covering the periphery of the sensing device, and a molding die used for manufacturing the electromagnetic sensor, wherein positioning means capable of engaging each other when the molding die is closed are provided at an axial end face of the sensing device and at an inner surface of the molding die that opposes to the axial end face of the sensing device, and one of the positioning means is a protrusion the diameter of which is reduced toward the top end and the other of them has a recess for complementally receiving the protrusion.

In accordance with the first aspect of the present invention, the protrusion protruded from one of the axial end face of the sensing device or the inner surface of the molding die intrudes into the complementary recess provided to the other of them when the molding die is closed. Therefore, even if slight misalignment device is caused of the sensing when the device is set in the lower die, this can be corrected upon closure of the molding die.

Further, in a preferred embodiment, in which a plurality of the positioning means are disposed in a circumferential direction, misalignment of the sensing device in the rotational direction can also be corrected.

In accordance with a second aspect of the present invention, another object can be attained by an electromagnetic sensor formed by inserting a sensing device having a bobbin around which coils are wound and a pole piece which is inserted through a central portion of the bobbin into a molding die and injecting a molten resin thereby covering the periphery of the sensing device, wherein the bobbin is provided at the outer surface thereof with a plurality of axially extending portions which are circumferentially spaced from each other and which can be substantially in an intimate contact with an inner circumferential surface of the molding die for molding the periphery of the top end of the pole piece, to thereby form an axial gap between each of the extending portions such that the molten resin flows by way of the gap to the top end of the pole piece.

In accordance with the second aspect of the present invention, the bobbin is provided at the outer surface thereof with a plurality of axially extending portions which are circumferentially spaced from each other and which can be substantially in an intimate contact with an inner circumferential surface of the molding die. Therefore, the central position of the pole piece is surely set in the molding die, and the molten resin flows easily as far as the top end of the pole piece. Therefore, molding can be applied as far as the top end if it is shaped by cutting, thereby providing protection for the top end of the pole piece and preventing the pole piece from rotation.

In accordance with a third aspect of the present invention, the further object can be attained by an electromagnetic sensor formed by inserting a sensing device into a molding die and injecting a molten resin thereby covering the periphery of the sensing device, wherein a positioning protrusion capable of engaging the molding die is protruded to an axial end face of the sensing device, and a portion of the positioning protrusion facing the inside of a cavity is shaped such that the size in a direction perpendicular to a flowing direction of the molten resin is gradually decreased as it is away from the center of a resin injection gate of the molding die.

In a preferred embodiment, a plurality of positioning protrusions are disposed on a common circle having a center aligned with the resin injection gate while being spaced apart from each other in a circumferential direction.

In accordance with the third aspect of the present invention, since the circumferential size of the positioning protrusion protruded to the sensing device is decreased toward the downstream of the molten resin, the molten resin flows easily at the periphery of the protrusion and air stagnation is less caused to the downstream of the protrusion. Accordingly, when the electromagnetic sensor is insert-molded, intimate contact between the sensing device and the covering portion can be attained to provide satisfactory water proofness.

DESCRIPTION OF THE PREFERRED EMBODIMENTS

The present invention will be explained by way of a preferred embodiment in details with reference to the accompanying drawings.

Figure 1:
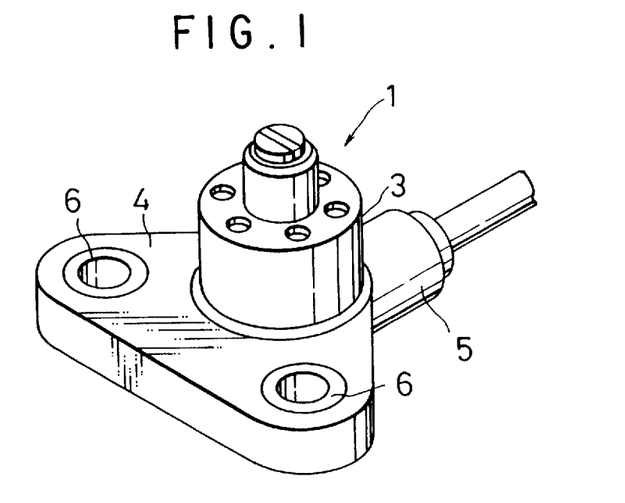
FIG. 1 is a perspective view of an electromagnetic sensor according to the present invention.

FIG. 1 shows an electromagnetic sensor according to the present invention. The electromagnetic sensor 1 comprises a housing (or covering) portion 3 covering the periphery of a sensing device 2 to be described later, an attaching stay 4 to a vehicle body and a cable lead out portion 5, which are integrally molded with a synthetic resin material. Metal collars 6 for receiving a bolt clamping force are inserted to the attaching stay 4.

Figure 2:
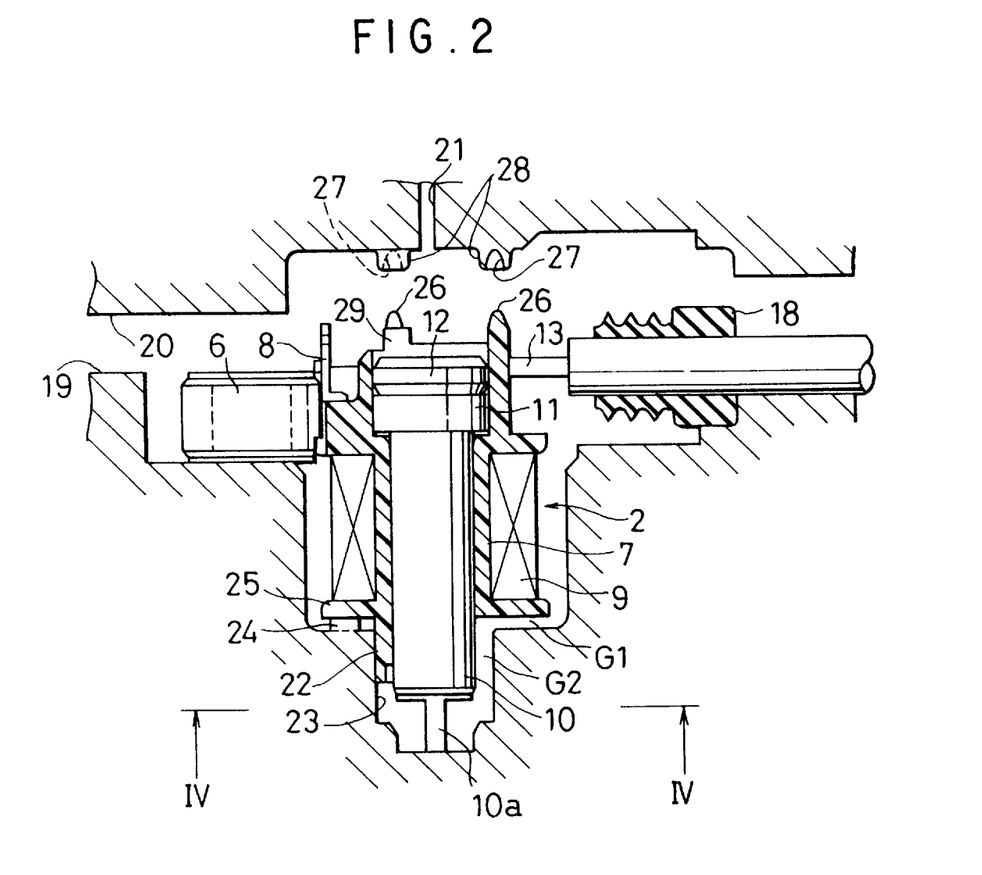
FIG. 2 is a vertical cross sectional view illustrating a state of setting a sensing device and collars in a molding die.

The sensing device 2 is previously manufactured by a separate step. The sensing device 2 comprises, as shown in FIG. 2, a bobbin 7 injection molded by using a synthetic resin material; coils 9 composed of conductor wires wound around the bobbin 7, in which wire ends are connected respectively to a pair of terminal members 8 which are press fitted and secured to an axial end face of the bobbin 7; a pole piece 10 mounted in a central bore of the bobbin 7; a permanent magnet 11; a yoke 12; and lead wires 13 connected by way of a connector (not illustrated) to a control circuit of a vehicle.

Figure 3:
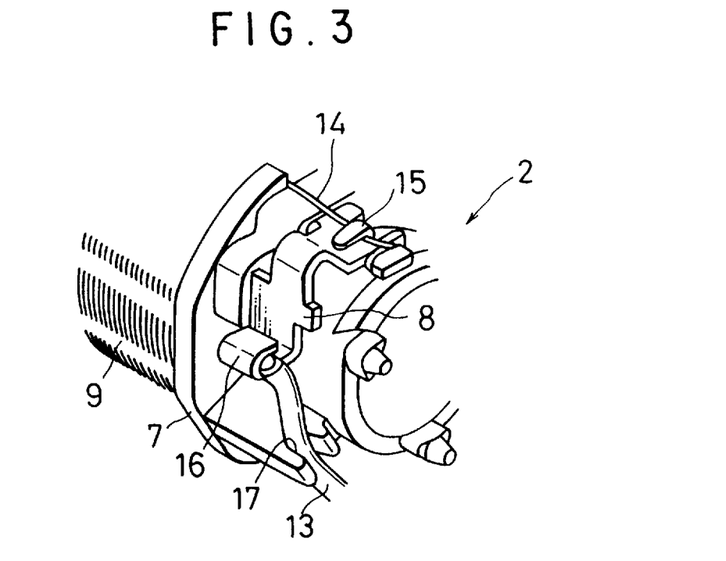
FIG. 3 is a perspective view for a main portion of the sensing device.

As shown in FIG. 3, the terminal end of the conductor wire 14 of the coils 9 is bound to a conductor wire retainer 15 of the terminal member 8, and an electric current is supplied while fitting and tightly urging an electrode to the retainer 15, by which an insulation layer on the surface of the conductor wire is melted, and a copper layer of the conductor wire 14 and a tin layer plated on the terminal member 8 are fused to each other and the end of the conductor wire 14 is joined by fusion to the conductor wire retainer 15.

Further, the lead wire 13 is firmly joined with a lead wire retainer 16 by the supply of an electric current while fitting and tightly urging an electrode to a lead wire retainer 16 of the terminal member 8. By electric heating, a copper layer of the lead wire 13 and a tin layer plated on the terminal member 8 are fused to each other, and a solder applied previously to the terminal end of the lead wire 13 is melted and cast over the entire joined portion. A high temperature solder is used for soldering.

Then, each of the lead wires 13 is prevented from displacement by slightly press-fitting the lead wire 13 into a retaining groove 17 formed at an end face of the bobbin 7. A cable retainer 18 is previously formed by resin molding to the cover of the lead wire 13.

Figure 4:
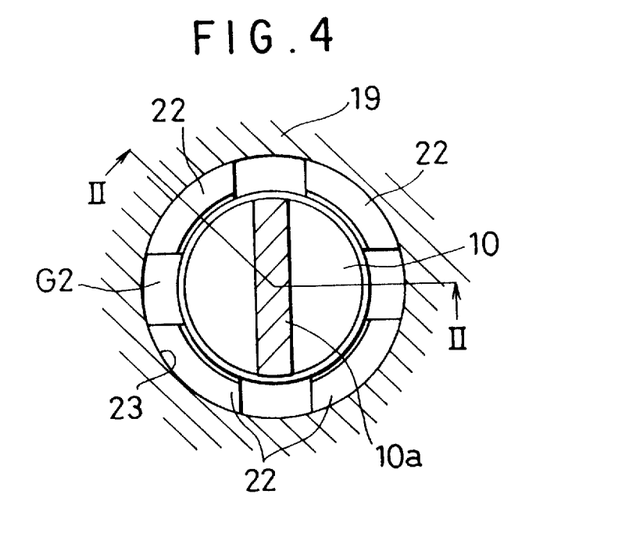
FIG. 4 is a cross sectional view taken along line IV—IV in FIG. 2.

As shown in FIG. 2 and FIG. 4, in the electromagnetic sensor 1 of this embodiment applied, for example, to a rotational speed detector, a top end 10a of a pole piece 10 is cut so as to conform the tooth shape of a pulser gear (not shown). For smoothly molding a resin also to the thus cut top end 10a, a plurality of axially extending portions 22 are formed to a lower circumferential portion of the bobbin 7 being circumferentially spaced apart from each other, at positions equally dividing the circumference (about at 2–4 positions: 4-positions in this embodiment). Each of the axially extending portions 22 has such a radial size that the portion is kept substantially in an intimate contact with the inner circumferential surface of the corresponding recess 23 formed to a lower die 19 (refer to FIG. 4).

It is also adapted such that the lower surface of a flange 25 of the bobbin 7 abuts against a plurality of protrusions 24 formed at the bottom face of a bobbin receiving portion of the lower die 19. They ensure reliable positioning of the sensing device 2 in the lower die 19.

Figure 5:
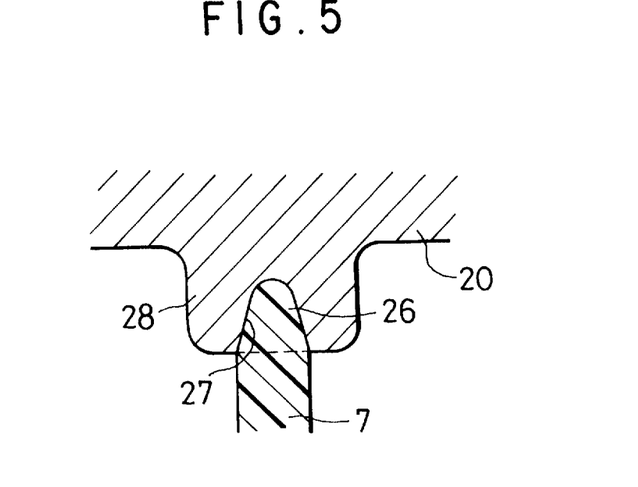
FIG. 5 is an enlarged explanatory view of the positioning means shown in FIG. 2.

Also as shown in FIG. 2, three pointed protrusions 26 carried respectively on three base seats 29 are protruded from an upper end face of the bobbin 7. The three protrusions 26(29) are situated on a common circle having a center aligned with a resin injection gate 21 formed to the upper die 20 and they are spaced apart from each other by an equal circumferential distance. The diameter of the protrusion 26 is increased toward the top end. Corresponding to them, three positioning protrusions 28 each having a tapered hole 27 capable of complementally receiving the pointed protrusion 26 are protruded to the inner surface of the upper die 20. The diameter of the tapered hole 27 is increased toward the hole opening. Thus, when the molding die is closed, the three pointed protrusions 26 at the upper end face of the bobbin 7 fit into the tapered holes 27 while being guided along the slope of the tapered hole 27 (refer to FIG. 5), so that the misalignment, if any, of the sensing device 2 relative to the dies 19, 20 is corrected, and the sensing device 2 is surely secured in the dies 19, 20.

As shown in FIG. 2, a flat surface is formed on the upper surface of the base seat 29 for the pointed protrusion 26. The after fitting the pointed protrusion 26 into the tapered aperture 27, the lower surface of the positioning protrusion 28 presses the upper surface of the base seat 29 to provide axial positioning. Accordingly, when the upper die 20 is closed, no pressing force exerts on the top end of the pointed protrusion 26.

Contrary to the manner described above, the pointed protrusion 26 may be disposed to the upper die 20, while the positioning protrusion 28 formed with the tapered hole 27 may be disposed to the bobbin 7.

The mold dies 19, 20 are illustrated only at a cross sectioned end face in FIG. 2. Further, the portion of the recess 23 for receiving the pole piece 10 is illustrated at a cross section along line II—II in FIG. 4.

Figure 7:
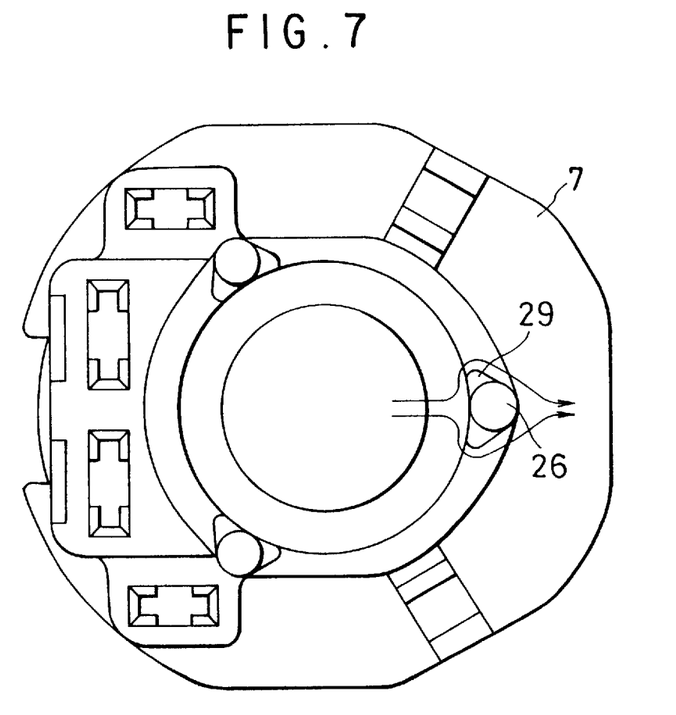
FIG. 7 is a view at an end face of a bobbin of the sensing device for illustrating an improved shape of a positioning protrusion.

As shown in FIG. 7, the base seat 29 for the protrusion 26 disposed on the upper end face of the bobbin 7 is shaped such that the size in the circumferential direction, that is, the size in a direction perpendicular to the flowing direction of the molten resin from the injection gate 21 (FIG. 2) to the outside (shown by arrows in FIG. 7) is decreased in a direction from the gate center to the radial outside.

Figure 6:
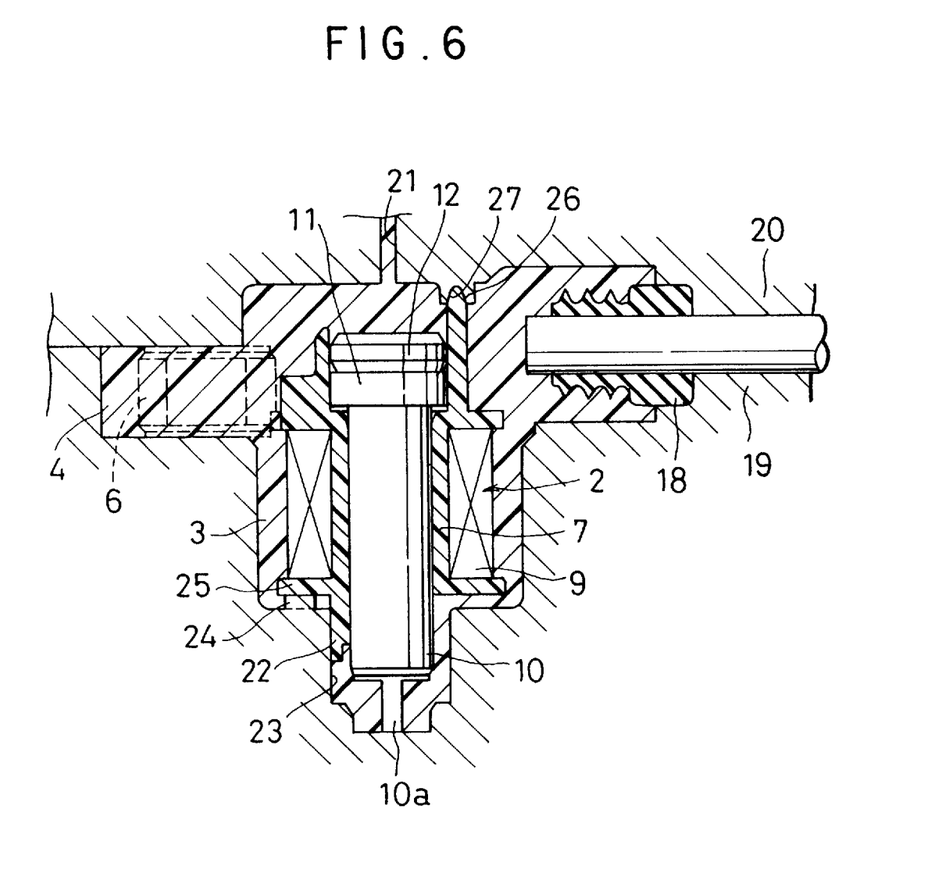
FIG. 6 is a vertical cross sectional view, corresponding to FIG. 2, illustrating a state of conducting resin molding in the molding die.

After the thus constructed sensing device 2 and the metal collar 6 are set in the lower die 19, the upper die 20 is closed over the lower die 19 and a molten resin is injected from an injection gate 21 to a cavity formed between the outer surface of the sensing device 2 and the inner circumferential surface of the lower die 19. Then, the housing portion 3 and the stay 4 are formed integrally in a state in which the sending device 2 and the collars 6 are inserted as shown also in FIG. 6.

Since the resin injection gate 21 is disposed to the upper die 20 at a position aligned with the axial center line of the sensing device 2, the molten resin injected from the gate 21 flows uniformly to all directions of the outer circumference of the sensing device 2 and finally covers the entire circumference of the sensing device 2.

In this embodiment, since the base seat 29 for the pointed protrusion 26 is shaped as shown in FIG. 7 such that the circumferential size thereof is gradually decreased toward the radial outside, the molten resin flows smoothly also to the side of the base seat 29 remote from the gate 21 as shown by arrows. Accordingly, since it is no worry for air stagnation A which would otherwise be caused in the downstream portion of the protrusion P as shown in FIG. 8, occurrence of weld marks can be prevented, and intimate contact can be attained between the sensing device 1 and the covering portion 3.

Further, the molten resin flows also to the top end 10a of the pole piece 10 by way of a gap G1 between the lower surface of the flange 25 of the bobbin 7 and a plurality of protrusions 24 formed on the bottom face of the lower die 19 and by way of a gap G2 between each of a plurality of axially extending portions 22. Therefore the periphery at the top end 10a of the pole piece 10 is also resin-molded and protected.

As has been described above, according to the present invention, the pointed protrusion 26 protruded from the axial end face of the bobbin 7 intrudes into the recess 27 formed to the inner surface of the upper mold 20 when the molding die is closed. Therefore, even if the sensing device 2 is slightly misaligned with the lower die 19, this can be corrected by closing the molding die. Further, as shown in the embodiment, since a plurality of positioning means 26(27) are disposed in the circumferential direction, rotational displacement of the sensing device 2 can also be corrected. Accordingly, the positioning accuracy of the sensing device 2 to the molding die can be enhanced greatly.

Further, according to the present invention, since the central position of the pole piece 10 is surely kept in the molding die, and the molten resin flows easily as far as the top end 10a of the pole piece 10, molding can be applied as far as the top end 10a even if the top end 10a is shaped by cutting. Accordingly, it is possible to enhance the effect of protecting the top end 10a of the pole piece 10 and can prevent the pole piece 10 from rotation.

Furthermore, according to the present invention, since the molten resin flows easily at the periphery of the positioning protrusions 29, air stagnation is less caused to the portion, particularly, at the downstream thereof. Accordingly, when the electromagnetic sensor 1 is insert-molded, intimate contact between the sensing device 2 and the covering portions can be attained to provide a great effect for obtaining satisfactory water proofness.

What is claimed is:

1. An electromagnetic sensor formed by inserting a sensing device into a molding die and injecting a molten resin, thereby covering a periphery of the sensing device with the resin, said sensing device comprising a bobbin defining an axis and a radial direction, coils wound around the bobbin and a pole piece which is inserted through the bobbin along said axis and in which a lower portion of the pole piece is formed into a top end adapted to conform to a shape of a pulsar gear, said bobbin comprising:

a plurality of axially extending portions disposed at a lower circumference of said bobbin, said axially extending portions being circumferentially spaced apart from each other and protruded radially so as to be substantially in an intimate contact with an inner circumferential wall of a recess formed contiguous with a bottom surface of a bobbin receiving portion of a molding die, thereby defining an axial gap between each of the adjacent extending portions for allowing the molten resin to flow around a second periphery of the top end; wherein the bobbin has a lower radial flange for engagement with a plurality of protrusions axially protruding from a bottom surface of the bobbin receiving portion of the molding die.

2. An electromagnetic sensor as defined in claim 1, further comprising positioning means provided at an axial end face of the sensing device, said positioning means adapted to engage positioning means provided at an inner surface of the molding die that opposes said axial end face of the sensing device.

3. An electromagnetic sensor as defined in claim 2, wherein said positioning means comprises a positioning protrusion disposed at the axial end face of the sensing device such that the protrusion engages a tapered hole formed to the inner surface of the molding die.

4. An electromagnetic sensor as defined in claim 2, wherein said positioning means comprises a tapered hole disposed at said axial end face of the sensing device such that the tapered hole receives a positioning protrusion formed to the inner surface of the molding die.

5. An electromagnetic sensor as defined in claim 3, wherein a portion of the positioning protrusion facing the inner surface of the molding die is shaped such that a width of said pointed protrusion gradually decreases along said radial direction so to have a greater width closer to said axis, whereby said width gradually decreases along a flowing direction of the molten resin.

6. An electromagnetic sensor as defined in claim 5, wherein a plurality of the positioning protrusions are disposed on a common circle having a center aligned with a resin injection gate, said protrusions being spaced apart from each other in a circumferential direction.

* * * * *

UNITED STATES PATENT AND TRADEMARK OFFICE
CERTIFICATE OF CORRECTION

PATENT NO. : 5,871,681
DATED : February 16, 1999
INVENTOR(S) : KARINO, K. et al.

It is certified that error appears in the above-identified patent and that said Letters Patent is hereby corrected as shown below:

On the title page, please change the assignee name from "Ohara & Komatsu, Assoc., Tokyo, Japan" to HONDA LOCK MFG. CO. LTD., MIYAZAKI, JAPAN.

Signed and Sealed this

Fourth Day of January, 2000

Attest:

Attesting Officer

*Acting Commissioner of Patents and Trademarks*